Patented Mar. 19, 1946

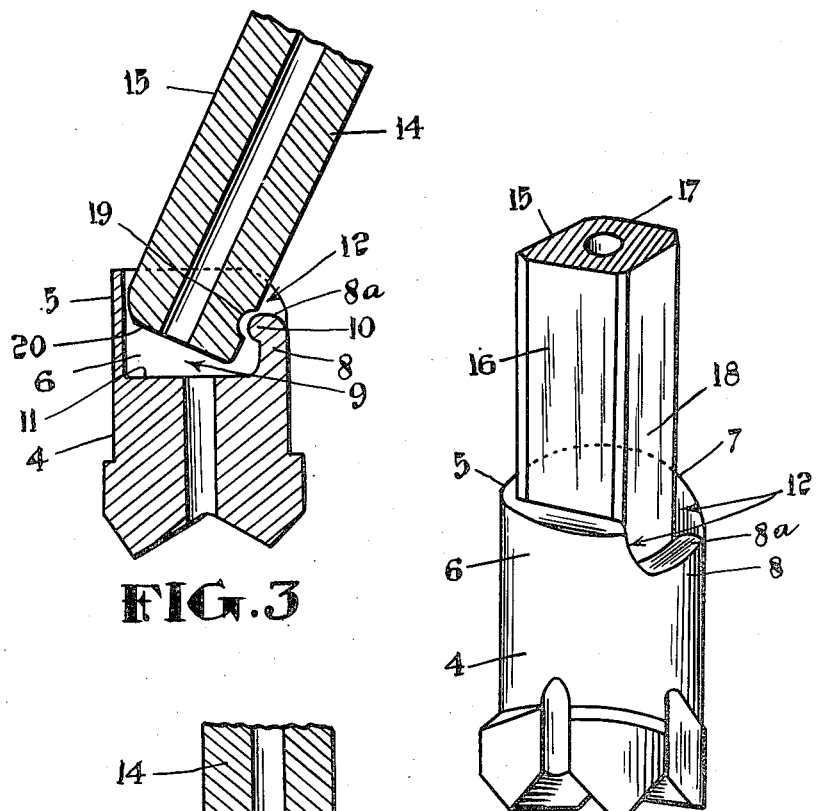
FIG.3
FIG.1
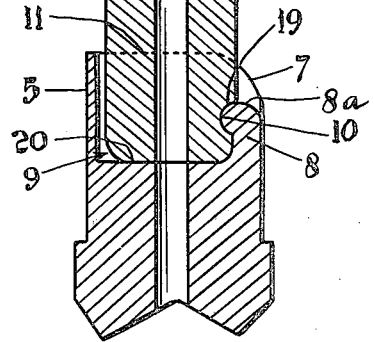
FIG.2
INVENTOR
FLEMING PARROTT
ATTORNEYS

2,396,747

UNITED STATES PATENT OFFICE 2,396,747

ROCK DRILL

Fleming Parrott, Madsen, Ontario, Canada

Application June 21, 1944, Serial No. 541,318

1 Claim. (Cl. 287—119)

This invention relates to improved means for releasably interlocking the bit and shank elements of a drill and is particularly applicable to rock drills.

The object of the invention is to provide a drill in which the shank and bit elements are formed with integral complementary interlocking parts for releasably securing said elements together in interfitting and interlocking engagement with each other, said complementary interlocking parts being designed so that they are easily formed during the fabrication of the bit and shank elements and do not add materially to the cost of fabricating such elements.

A further object is to provide a drill in which the complementary interlocking parts of the shank and bit elements are designed so that the fabrication thereof decreases the amount of metal contained in said elements and thereby effects a substantial saving of material in the manufacture of a large number of such drills.

According to this invention the bit is formed with a non-circular socket provided with a slot extending downwardly from the mouth thereof and terminating a predetermined distance above the bottom wall of the socket, the upper edge portion of the socket-forming wall defining the lower end of said slot being formed to provide an inwardly projecting rib which lies above and parallel with the bottom wall of the socket and is spaced a predetermined distance therefrom, the width of said slot being sufficient to permit of angular movement of the drill shank therein. The bit-engaging end portion of the drill shank which is inserted in said socket is of a non-circular shape conforming to that of the socket so that the shank and bit are prevented from turning relatively to each other in their assembled interfitting relation. One side of the bit-engaging end portion of the shank is formed with a rib-receiving groove which lies parallel with the end of the shank which engages the bottom wall of the socket and which is spaced from said end of the shank a distance corresponding to the spacing of the socket-carried rib above the bottom wall of the socket. The bit-engaging end of the shank is first inserted in the socket of the bit with the shank arranged so that its longitudinal axis is inclined with reference to the central axis of the socket. This permits the bit-engaging end of the shank to be initially fitted in the socket so that the inwardly directed rib projection of the socket is partly received in the groove of the shank so that, when the shank and bit are moved relatively to each other to bring the central longitudinal axis of the shank in alignment with the central axis of the socket, the rib will be entirely received in said groove and will overlie the lower side wall portion of the groove in such manner as to prevent separation of the shank and bit by relative movement in the direction of their longitudinal axes, such separation being, however, permitted when the shank and bit are moved relatively to each other to a predetermined position in which the central longitudinal axes are relatively inclined.

Proceeding now to a more detailed description of this invention reference will be had to the accompanying drawing, in which—

Fig. 1 is a perspective view of a drill bit and drill shank designed and interlocked in accordance with my invention.

Fig. 2 is a vertical longitudinal sectional view of the assembly shown in Fig. 1.

Fig. 3 is a view similar to Fig. 2 but showing the manner in which the bit and shank elements are arranged to permit the bit-engaging end of the shank to be moved into or out of interlocking engagement with the socket portion of the drill bit.

As shown in this drawing the drill bit 4 is formed with angularly related socket-forming walls 5, 6, 7 and 8 defining a rectangular shank-receiving socket 9. An upper edge portion 8a of the socket-forming wall 8 is positioned below the upper edges of the companion socket-forming walls and is formed to provide an inwardly projecting rib 10 which overlies and is spaced a predetermined distance from the bottom wall 11 of the socket. This construction results in a socket provided, at one side, with a wide slot 12 extending downwardly from the mouth of the socket and terminating above the bottom wall of the socket, the closed lower end of said slot being defined by the rib 10 and the upper edge 8a of the socket-forming wall 8.

The shank of the drill is represented by the bit-engaging end portion 14 which is adapted to be inserted in said socket and is bounded by angularly related side faces 15, 16, 17 and 18 which coact with the angularly related socket-forming walls of the drill bit to prevent relative rotation of the bit and shank when assembled in the interfitting and interlocking relation shown in Figs. 1 and 2. The side face 18 of the shank is formed with a groove 19 which lies parallel with the end surface 20 of the shank which, in the assembled relation of the parts shown in Figs. 1 and 2, engages the bottom wall of the socket 9. The groove 19 is spaced from the end surface 20 of the shank a distance corresponding substantially to the spacing of the rib 18 above the bottom wall of the socket 9. The bit-engaging end 14 of the drill shank is initially inserted in the socket 9 with the shank arranged as shown in Fig. 3 so that its central longitudinal axis is at an angle to the central axis of the socket. This initial assembly of the shank and bit permits the rib 18 to be partially inserted in the groove 19 so that, when the shank and bit are subsequently moved relatively to each other so as to bring their central axes into alignment, the rib 18 will be completely received in the groove as shown in Fig. 3 and will overlie the lower side wall of the groove in such manner as to prevent separation of the shank and bit by relative movement thereof in the direction of their aligned longitudinal axes. The socket 9 is made sufficiently larger than the end portion 14 of the shank to permit the aforesaid interlocking assembly of the shank and bit to be accomplished as previously described but the clearance fit of the shank in the socket is not sufficient to permit the rib 18 to be completely withdrawn from the groove by any permissible lateral movement of the interlocked shank and bit elements in a direction perpendicular to their longitudinal axis.

When it is desired to separate the shank and bit elements this is accomplished by swinging the shank from the position shown in Figs. 1 and 2 to the position shown in Fig. 3. In this last mentioned position of the shank and bit elements the shank may be lifted clear of the socket 9. The width of the slot 12, particularly in the upper portion thereof, is necessarily such as to permit angular movement of the shank in said slot during interlocking assembly or separation of the shank and bit elements.

I claim:

A drill rod comprising a bit provided with a shank-receiving socket including a bottom wall and four angularly related imperforate side walls extending upwardly from said bottom wall, one of said side walls being substantially shorter than the three remaining side walls and being provided, at its upper edge, with an inwardly directed rib extending the full length of said edge and overlying said bottom wall, and a drill shank provided with a four-sided end portion adapted to be received in said socket and having one of its side faces provided with a groove in which said rib is adapted to be fully inserted by relative angular movement of the shank and bit to prevent straight line separation of the shank and bit when they are aligned with each other with the rib received in said groove, the clearance fit of the shank in the socket being sufficient to permit the aforesaid interlocking assembly of the shank and bit but being insufficient to permit the rib to be completely withdrawn from the groove by any permissible lateral movement of the interlocked shank and bit elements in a direction perpendicular to their longitudinal axes.

FLEMING PARROTT.